(12) United States Patent
Mackert

(10) Patent No.: US 6,190,290 B1
(45) Date of Patent: Feb. 20, 2001

(54) WHEEL SUPPORT

(75) Inventor: Ross A. Mackert, St. Louis Park, MN (US)

(73) Assignee: Graber Products, Inc., Madison, WI (US)

( * ) Notice: Under 35 U.S.C. 154(b), the term of this patent shall be extended for 0 days.

(21) Appl. No.: 08/949,238

(22) Filed: Oct. 10, 1997

Related U.S. Application Data

(60) Provisional application No. 60/027,695, filed on Oct. 10, 1996.

(51) Int. Cl.[7] .............................. A63B 22/06; A63B 69/16
(52) U.S. Cl. ................................................ 482/57; 482/61
(58) Field of Search ................... 482/57, 61; 211/17–19, 211/20–24; D1/129; D7/610; D27/102, 103, 133, 134, 135; 248/346.01, 351; 280/293; D12/111, 114, 117; D21/662, 686

(56) References Cited

U.S. PATENT DOCUMENTS

| | | | |
|---|---|---|---|
| D. 196,351 | * 9/1963 | Anholt | D27/102 |
| D. 310,302 | * 9/1990 | Southard | 211/64 |
| 653,048 | 7/1900 | Wigg . | |
| 2,095,672 | 10/1937 | Miller . | |
| 2,498,047 | * 2/1950 | Myers | 601/93 |
| 2,717,084 | 9/1955 | Groenendal . | |
| 2,781,651 | * 2/1957 | Cutler | 248/346.11 |
| 4,442,961 | * 4/1984 | Bott | 224/570 |
| 4,802,666 | * 2/1989 | Rodriqguez | 482/61 |
| 4,815,730 | * 3/1989 | Hoffenberg et al. | 482/61 |
| 4,856,659 | 8/1989 | Krebs | 211/24 |
| 5,076,534 | * 12/1991 | Adam | 248/678 |
| 5,078,277 | 1/1992 | Tschritter | 211/20 |
| 5,704,876 | * 1/1998 | Baatz | 482/61 |
| 5,722,438 | * 3/1998 | Gors | 131/231 |

FOREIGN PATENT DOCUMENTS

517 * 1/1990 (GB) .................................... 482/61

* cited by examiner

Primary Examiner—Mickey Yu
Assistant Examiner—Denise Pothier
(74) Attorney, Agent, or Firm—Andrus, Sceales, Starke & Sawall, LLP

(57) ABSTRACT

A support for a wheel at a plurality of heights above a surface includes a housing adapted to rest upon the surface, a first wheel receiving region configured to support the wheel at a first height above the surface when the housing rests upon the surface, and a second wheel receiving region configured to support the wheel at a second height above the surface when the housing rests upon the surface, the second height being different from the first height.

15 Claims, 3 Drawing Sheets

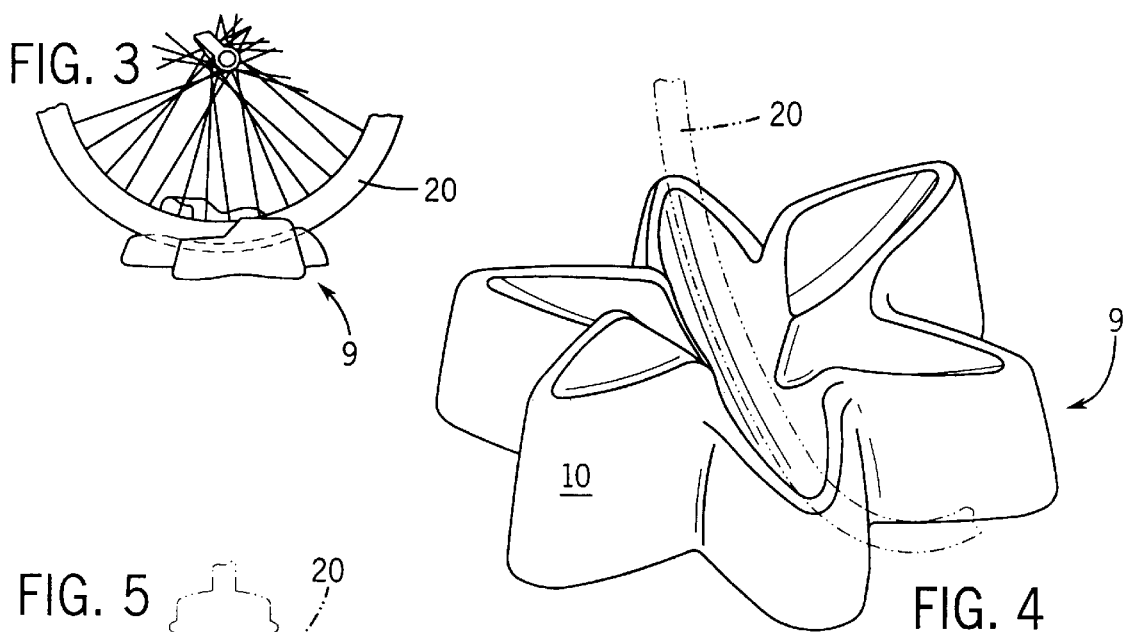
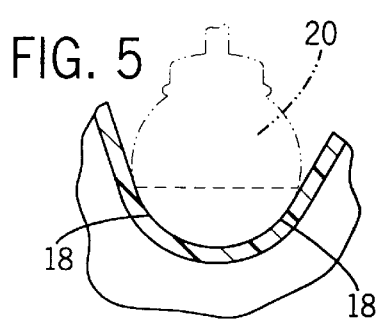
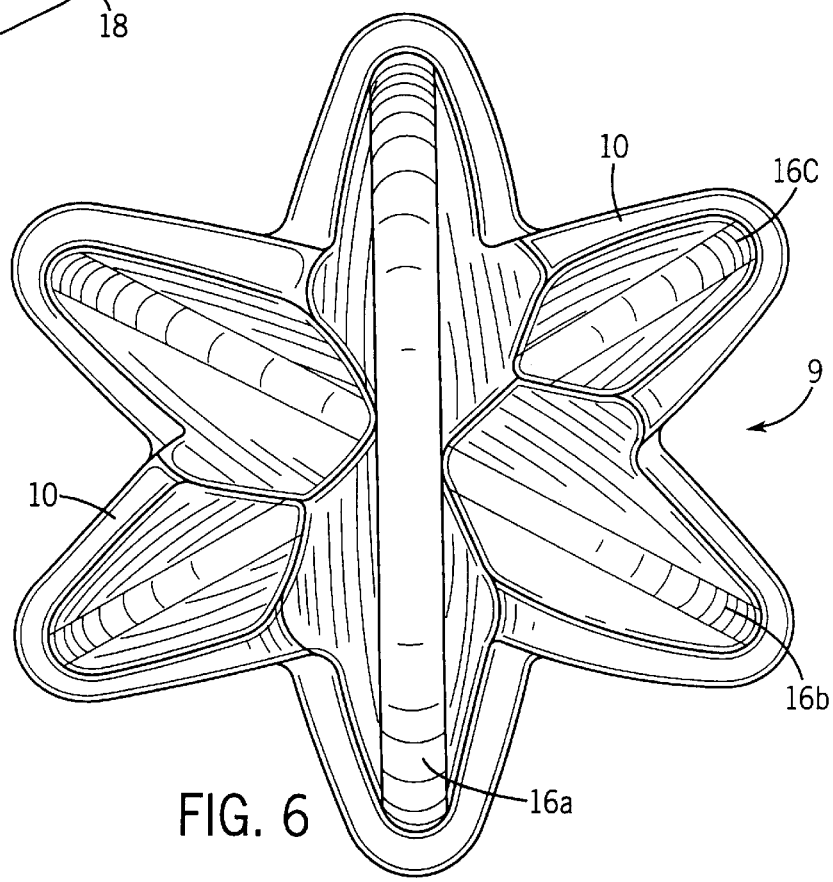

WHEEL SUPPORT

This appln claims the benefit of U.S. Provisional No. 60/027,695 filed Oct. 10, 1996.

BACKGROUND

The present invention relates generally to exercise devices and, more particularly, to an accessory for use with an exercise device.

Bicycle trainers are exercise devices generally in which the rear wheel of a bicycle is supported by a frame in a raised position and in contact with a resistance element. As a result of raising the rear end of the bicycle for mounting in a trainer, the bicycle and its rider may be pitched forward, i.e., may be placed in an inclined position with respect to the normal riding position where both front and rear bicycle tires are in contact with the ground. Such an angled position may be uncomfortable and, in some riders, may even produce temporary injury to the nerve structure of the hands, and other physical strains.

It should be noted that some riders prefer to ride in an inclined position wherein the rear of the bicycle is lower or higher. Some riders may attempt to jury-rig a front wheel support system which may be unstable and dangerous.

SUMMARY

In general, in a first aspect, the invention features apparatus for supporting a wheel at a plurality of heights above a surface, including a housing adapted to rest upon the surface, a first wheel receiving region configured to support the wheel at a first height above the surface when the housing rests upon the surface, and a second wheel receiving region configured to support the wheel at a second height above the surface when the housing rests upon the surface, the second height being different from the first height.

Embodiments of the invention may include one or more of the following features. The wheel can be of a bicycle being used in a bicycle trainer. A third wheel receiving region can be configured to support the wheel at a third height above the surface when the housing rests upon the surface, the third height being different from either the first or second heights. The first and second wheel receiving regions can be substantially trough shaped, and can intersect. The first and second wheel receiving regions can have respective side walls, wherein the side walls are adapted to support the wheel in a substantially upright position respective to the surface. The first and second wheel receiving regions can be adapted to receive wheels having different radii. A support web can be within the housing and between the surface and each respective wheel receiving region.

In general, in another aspect, the invention features apparatus for supporting a wheel of a bicycle being used in a bicycle trainer at a plurality of heights above a surface, including a housing adapted to rest upon the surface, a first wheel receiving region configured to support the wheel at a first height above the surface when the housing rests upon the surface, a second wheel receiving region configured to support the wheel at a second height above the surface when the housing rests upon the surface, and a third wheel receiving region configured to support the wheel at a third height above the surface when the housing rests upon the surface, the first, second, and third heights being different from one another, the first, second, and third wheel receiving regions being substantially trough shaped, the first, second, and third wheel receiving regions having respective side walls, wherein the side walls are adapted to support the wheel in a substantially upright position respective to the surface.

In general, in another aspect, the invention features apparatus for supporting wheels above a surface, including a housing adapted to rest upon the surface, a first wheel receiving region configured to support a first wheel having a first radius at a height above the surface when the housing rests upon the surface, and a second wheel receiving region configured to support a second wheel having a second radius at a height above the surface when the housing rests upon the surface.

In general, in another aspect, the invention features apparatus for supporting bicycle wheels being used in a bicycle trainer above a surface, including a housing adapted to rest upon the surface, a first wheel receiving region configured to support a first wheel having a first radius above the surface when the housing rests upon the surface, a second wheel receiving region configured to support a second wheel having a second radius above the surface when the housing rests upon the surface, and a third wheel receiving region configured to support a third wheel having a third radius above the surface when the housing rests upon the surface, the first, second, and third radii being different from one another, the first, second, and third wheel receiving regions being substantially trough shaped, the first, second, and third wheel receiving regions having respective side walls, wherein the side walls are adapted to support the wheel in a substantially upright position respective to the surface.

In general, in another aspect, the invention features a method for supporting a wheel at a plurality of heights above a surface, including providing, in a housing adapted to rest upon the surface, a first wheel receiving region configured to support the wheel at a first height above the surface when the housing rests upon the surface, and providing, in the housing, a second wheel receiving region configured to support the wheel at a second height above the surface when the housing rests upon the surface, the second height being different from the first height.

Advantages of the invention may include one or more of the following. A riser block for supporting a bicycle wheel can be a unitary, single-piece structure, whose upper surface can be contoured to receive any one of a number (for example, three) of bicycle tire sizes, each having a different radius. When in place within a particular wheel support, a bicycle coupled to a trainer can be supported laterally to enhance stability. The riser block can be adapted to receive and support more than one different size of bicycle tires. Differently sized support nodes can support different ranges of tire sizes. The nodes can also support the same tire at a variety of different heights, allowing a user, for example, to set their bicycle during training at an even, incline, or decline position. The riser block can have a honeycomb-like internal support structure to provide a riser block that is light in weight, yet provides sufficient support and stability for a bicycle.

DRAWINGS

FIG. 3 depicts a front wheel of a bicycle supported in the riser block.

FIG. 4 depicts the front wheel of a bicycle supported by the riser block.

FIG. 5 is a sectional view depicting one support lobe of the riser block and the lateral support provided thereby.

FIG. 6 is a top plan view of the riser block showing the three support lobes thereof.

DESCRIPTION

Figure 2:
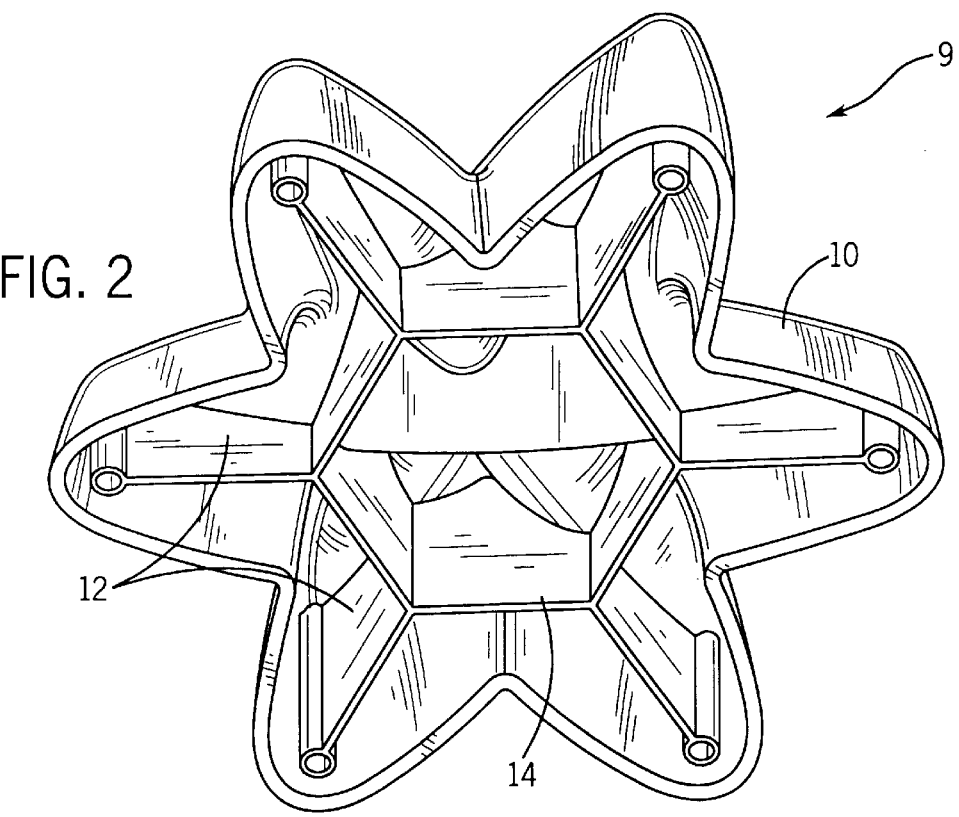
FIG. 2 is a perspective view of the underside of the riser block with portions removed for clarity.
Figure 1:
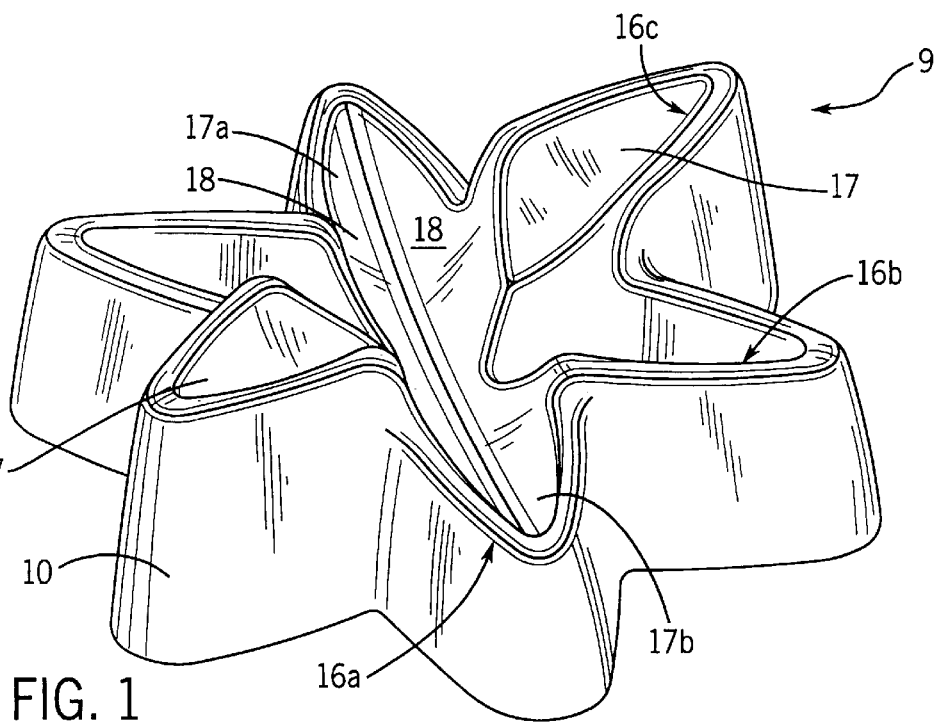
FIG. 1 is a perspective view of a riser block.

Referring to FIGS. 1 and 2, riser block 9 includes a housing defined in part by side wall 10. Sidewall 10 encloses a generally hollow interior occupied by a plurality of webs 12. Webs 12 are connected to central flanges 14 arranged hexagonally. The flanges 14 and webs 12 provide a lightweight, honeycomb support structure. Riser block 9 presents a star-shaped, unitary appearance.

Referring particularly to FIGS. 1 and 6, the upper surface of riser block 9 includes three trough-like support nodes 16a through 16c. Respective opposing lobes 17a and 17b define each of three support nodes 16a through 16c, and can receive the tire 20 of a bicycle wheel as depicted in FIGS. 3 through 5.

Referring particularly to FIG. 5, sidewalls 18 of a particular support node 16a cradle the sidewalls of the tire 20 to provide lateral stability for a bicycle supported by the riser block 9.

The three support nodes 16a through 16c are formed at different heights respective to riser block 9, and can be sized to accept wheels having different respective radii. Support nodes 16a through 16c at different heights allow a bicycle tire 20 to be located at a height appropriate for a particular user, a particular bicycle, or for a particular bicycle trainer used with riser block 9. For example, the same riser block 9 can be used with any number of different bicycles having differently sized wheels. Or, a user can place their bicycle in any of a number of provided support nodes 16 to set their bicycle at a level pitch, at an incline, or at decline position, for different training purposes. Or, a user can use the same riser block with different bicycle trainers to maintain a level pitch despite having the bicycle's rear wheel being at different respective heights.

Figure 7:
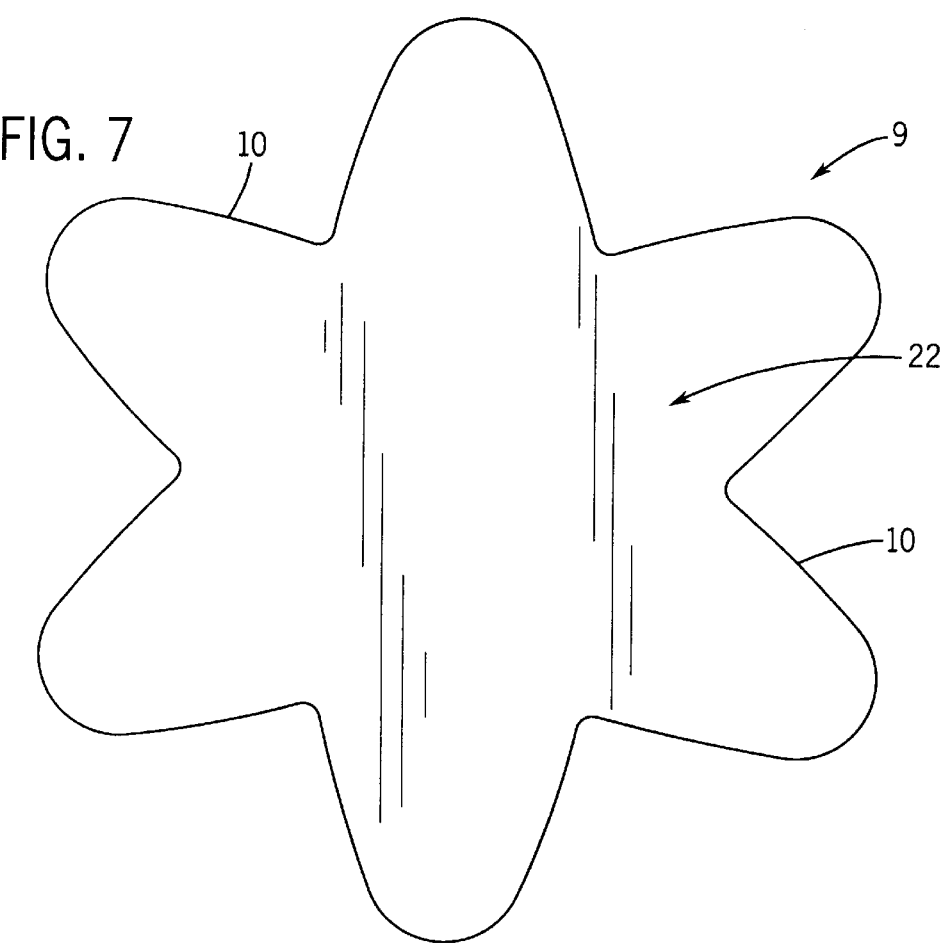
FIG. 7 is a bottom plan view of one embodiment of the riser block, wherein the bottom or underside is closed off.

FIGS. 6 and 7 depict a riser block 9 from above and below, where FIG. 7 shows riser block 9 having base plate 22 that encloses the bottom surface.

Figure 8:
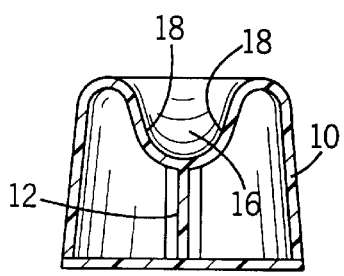
FIGS. 8–10 depict alternative embodiments of the riser block wherein different support mechanisms are provided, namely, in FIG. 8 a single, generally vertical web at the underside of the support lobe, in FIG. 9 a generally foam-filled interior, and in FIG. 10 the entire device being made from a single material.
Figure 9:
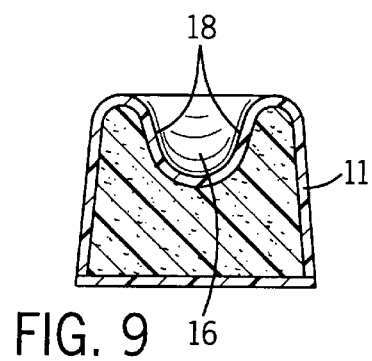
Figure 10:
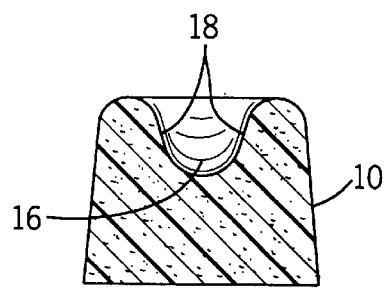

FIGS. 8–10 depict alternative embodiments for constructing riser block 9, including the preferred embodiment depicted in FIG. 8 wherein internal webs 12 are aligned with the longitudinal axis of a respective support lobe 16. This construction provides good support for the weight of the bicycle and the rider.

FIG. 9 depicts a filled riser block 9 in which an exterior skin 11 is filled with a suitable material such as expandable foam or the like. FIG. 10 depicts a solid riser block 9 wherein no external skin is required.

Other embodiments are within the scope of the following claims. Although riser block 9 is depicted as star-shaped, the star points corresponding to the support nodes can be rounded to any desired degree, giving the riser block a generally rounder shape. Any other appropriate housing and support node configuration can be employed. The riser block can have various combinations of nodes with different chord lengths. The support nodes can be organized in various ways within the riser block, and have a number of different orientations and positions. Although the riser block is intended primarily for use with bicycle trainers, the device can be adapted for use with other exercise machines, such as stationary bikes or roller devices. A variety of materials can be used to manufacture the riser block such as aluminum, steel, metallic alloys, various plastics and vinyls, plexiglass, fiberglass or the like.

What is claimed is:

1. Apparatus for supporting a wheel of a bicycle being used in a bicycle trainer at a plurality of heights above a surface, comprising:

a housing adapted to rest upon the surface and a plurality of substantially trough shaped wheel receiving regions integrally formed with the housing, each region having respective side walls, wherein the side walls are spaced to support the wheel in a substantially upright position in relation to the surface, the trough shaped wheel receiving regions being superposed and intersecting to produce a generally star-shaped pattern, and wherein each of said plurality of wheel receiving regions is configured to support the wheel at a unique selected height.

2. The apparatus of claim 1 wherein at least three wheel receiving regions are formed integrally with the housing and configured to support the wheel at one of three unique positions above the surface when the housing rests upon the surface.

3. The apparatus of claim 1 wherein the plurality of wheel receiving regions include a first wheel receiving region and a second wheel receiving region adapted to receive wheels having different radii.

4. The apparatus of claim 1 further comprising a support web within the housing and between the surface and each respective wheel receiving region.

5. A bicycle trainer assembly, comprising:

a bicycle having a wheel;

a housing resting upon a surface;

a first substantially trough shaped wheel receiving region, a second substantially trough shaped wheel receiving region, and a third substantially trough shaped wheel receiving region, wherein each substantially trough shaped wheel receiving region is integrally formed with the housing and has respective side walls, wherein the side walls are spaced to support the wheel in a substantially upright position in relation to the surface, the trough shaped wheel receiving regions being superposed and intersecting to produce a generally star-shaped pattern;

the first wheel receiving region being configured to support the wheel at a first height above the surface when the housing rests upon the surface;

the second wheel receiving region being configured to support the wheel at a second height above the surface when the housing rests upon the surface; and the third wheel receiving region being configured to support the wheel at a third height above the surface when the housing rests upon the surface, the first, second, and third heights being different from one another.

6. Apparatus for supporting wheels of bicycles being used in a bicycle trainer above a surface, comprising:

a housing adapted to rest upon the surface and a plurality of substantially trough shaped wheel receiving regions integrally formed with the housing, each region having respective side walls wherein the side walls are spaced to support the wheel in a substantially upright position in relation to the surface, the trough shaped wheel receiving regions being superposed and intersecting to produce a generally star-shaped pattern;

a first wheel receiving region of said plurality of wheel receiving regions integral with the housing and configured to support a first wheel having a first radius at a first height above the surface when the housing rests upon the surface; and a second wheel receiving region of said plurality of wheel receiving regions integral with the housing and configured to support a second wheel having a second radius at a second height above the surface when the housing rests upon the surface, wherein the second height is different from the first height.

7. The apparatus of claim 6 wherein said plurality of substantially trough shaped wheel receiving regions further comprises a third wheel receiving region integral with the housing and configured to support a third wheel having a third radius above the surface when the housing rests upon the surface.

8. The apparatus of claim 6 further comprising a support web within the housing and between the surface and each respective wheel receiving region.

9. A method for supporting a wheel of a bicycle being used in a bicycle trainer at a plurality of heights above a surface comprising:

providing in a housing adapted to rest upon the surface a first wheel receiving region configured to support the wheel at a first height above the surface when the housing rests upon the surface;

providing, in the housing, a second wheel receiving region configured to support the wheel at a second height above the surface when the housing rests upon the surface, the second height being different from the first height; and providing, in the housing, a third wheel receiving region configured to support the wheel at a third height above the surface when the housing rests upon the surface, the third height being different from either the first or second heights.

10. The method of claim 9 wherein the first and second wheel receiving regions are substantially trough shaped.

11. The method of claim 9 wherein the first and second wheel receiving regions intersect.

12. The method of claim 9 wherein the first and second wheel receiving regions have respective side walls, wherein the side walls are adapted to support the wheel in a substantially upright position respective to the surface.

13. The method of claim 9 wherein the first and second wheel receiving regions are adapted to receive wheels having different radii.

14. The method of claim 9 further comprising providing a support web within the housing and between the surface and each respective wheel receiving region.

15. A method for supporting a wheel of a bicycle being used in a bicycle trainer at a height above a surface, comprising:

providing, in a housing adapted to rest upon the surface, a first wheel receiving region configured to support the wheel of a first radius above the surface when the housing rests upon the surface;

providing, in the housing, a second wheel receiving region configured to support a wheel of a second radius above the surface when the housing rests upon the surface, the second radius being different from the first radius;

providing, in the housing, a third wheel receiving region configured to support a wheel of a third radius above the surface when the housing rests upon the surface, the third radius being different from either the first or second radius, the first, second, and third radii being different from one another, the first, second, and third wheel receiving regions being substantially trough shaped, and the first, second, and third wheel receiving regions having respective side walls; and providing support to a wheel with one of said wheel receiving region respective side walls so as to support the wheel in a substantially upright position with respect to the surface.

* * * * *